Oct. 22, 1968   C. A. WILLNER   3,406,781
DEACTIVATING SYSTEM IN SEISMIC PROSPECTING
Filed March 24, 1967

INVENTOR.
CARL A. WILLNER
BY Paul F. Hawley
ATTORNEY

United States Patent Office

3,406,781
Patented Oct. 22, 1968

3,406,781
DEACTIVATING SYSTEM IN SEISMIC
PROSPECTING
Carl A. Willner, Houston, Tex., assignor to Pan American
Petroleum Corporation, Tulsa, Okla., a corporation
of Delaware
Filed Mar. 24, 1967, Ser. No. 625,870
4 Claims. (Cl. 181—.5)

ABSTRACT OF THE DISCLOSURE

Unused seismometers connected to cables lying near others connected at one end to seismometers and at the other end to amplifying and recording apparatus, can introduce undesired signals into the recording system by capacitive coupling. Such signals, called cross feed, can be minimized by clamping the active elements in the unused seismometers electrically by applying a direct voltage across such seismometers. This raises the signal-to-noise ratio in the prospecting apparatus.

*Cross reference to related applications*

None.

*Background of the invention*

In commercial seismic prospecting, seismometers, or geophones, are placed at or near the surface of the ground and connected by a plurality of long cables to the recording truck where electric signals generated by the response of the seismometers to seismic waves are amplified and recorded. Customarily this spread of seismometers is changed from time to time to change the relation of the seismometers to the source of the seismic energy. All seismometers are initially connected to conductors within the cables and the cables to the recording truck, but only certain or the conductors, depending on the configuration and the location of the respective seismometer groups, are connected at any one recording period to the input transformers forming part of the amplifier-recorder arrangement. This means that the conductors within the cables connected to seismometers whose outputs are not to be recorded are dead-ended at the truck. These conductors are adjacent to other conductors connected to active seismometers at one end and to the input transformers at the other end. There is always capacitive coupling, and in some cases, conductive coupling between these adjacent conductors. As a result, whenever seismic energy vibrates the unused seismometers, the connected conductors carry corresponding electric signals which should not be recorded. However, due to the coupling between cables, a fraction of such signal is imposed on the cables carrying useful seismic signals, which thus contributes to the noise, or undesired electric waves being recorded. It is the purpose of this invention to reduce the extraneous noise caused by this pickup of unwanted signals from seismometer groups that are connected to the cables but not to the recording apparatus. It has been found that in many circumstances the noise due to this pickup has been sufficient to make otherwise useful records substantially unreadable.

It is, of course, possible to omit these unused seismometer groups and their associated cables. However, this means that a large amount of time is required to move the seismometers to new locations and possibly to change the grouping of the seismometers. This generally is uneconomical.

It should be pointed out that a seismometer group consists of a plurality of seismometers which are ordinarily located in the same general region, at most a few hundred feet apart, connected ordinarily with several in series and each such subgroup connected in parallel with the other subgroups across the two input conductors of the cable. By such grouping it is possible to average the effects of the seismic signals obtained tending to minimize random noise. Various arrangements as to the numbers of seismometers in series and the number of groups in parallel is possible; in general, my invention is not affected by such arrangement.

Each seismometer is a small electrical generator. While many designs have been used, generically, most of these involve a static magnetic field set up by some sort of a magnetic pole structure involving a permanent magnet. A coil is elastically supported from the seismometer case and is located, in the absence of current in the coil, about in the middle of the magnetic field. Motion of the case, for example due to seismic waves, tends to move the magnetic field relative to the elastically suspended coil, which tends to remain stationary in space. This causes relative motion of the magnetic field with respect to the coil, generating an electric voltage in the lead which, as discussed above, are connected to a set of conductors.

As far as is known, no arrangement has been previously disclosed to eliminate effectively this type of cross feed.

*Summary of the invention*

In brief, the invention comprises connecting the unused seismometer groups through their associated connected cables to a source of direct voltage. This produces direct current in each active coil in the seismometers. In turn, this produces a steady magnetic field which reacts with the magnetic field of the seismometer. Reaction between these two fields forces the moving, or sprung, mass of the seismometer towards the limit of its travel, and if the current is sufficient, drives the sprung mass into contact with some part of the case or some part integral with the case of the seismometer. Accordingly, the sprung mass can be considered to be electrically clamped against the case. As a result of this, vibration of the case of the seismometer by seismic waves in the ordinary course of the prospecting does not move the sprung mass appreciably and, accordingly, produces essentially no electrical output. Even if the sprung mass is not mechanically in contact with some part of the case, the electric current at least drives it from its ordinary position of maximum sensitivity to a position of lower sensitivity so that undesirable signals coupled to the used conductors are minimized.

This specification is illustrated by the accompanying drawing which is to be read in connection with the subsequent description.

*Description of the preferred embodiment*

Figure 1:
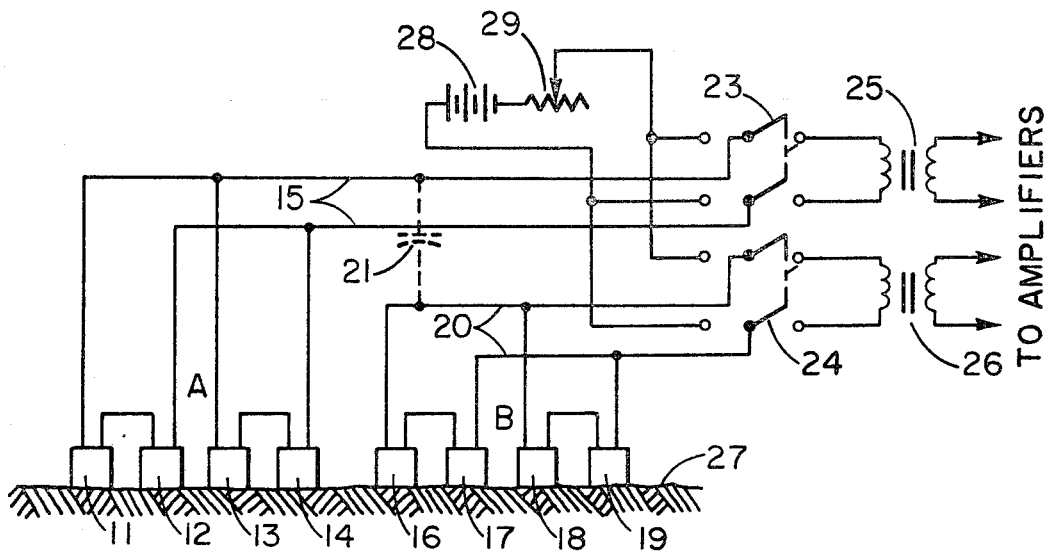
FIGURE 1 shows in diagrammatic form two groups of seismometers with attendant cables and one arrangement for applying electrical clamping to either group of seismometers.

In FIGURE 1 there has been shown two seismometer groups A and B. Each, in this case, is shown consisting of four seismometers, though more or less may be used, as is well understood in this art. The four seismometers 11–14 of group A are connected, in this case in series-parallel, across the two conductors 15. Similarly, the seismometers 16–19 of group B are connected across the terminals of conductors 20 in the same manner. Ordinarily these conductors shown will run in a cable a considerable distance to the recording truck, for example of the order of 500 to 1,000 feet or more. Conductors 15 and 20 will accordingly have capacitance coupling the respective wires, as illustrated by the dotted capacitor 21. In some cases, the wires of cables 15 and 20 may, in fact, be enclosed in a common jacket, in which case the coupling capacitance 21 will be somewhat higher.

The cables from the seismometer groups run to the recording truck carrying the amplifier-recording system. It is assumed in FIGURE 1 that at the moment the seismometers in group B are not to be recorded; whereas, those in group A are being recorded. In this case, the switch 23 is thrown to the right. Accordingly, the seismometers of group A are connected to the primary coil of input transformer 25, the secondary of which is connected to the customary field amplifier. The balance of the recording equipment is not shown, being well known in this art.

On the other hand, switch 24 is not thrown to connect the primary of input transformer 26 to another amplifier channel. In fact, this input transformer 26 will be connected to another group of seismometers (not shown). The problem arises from the fact that the group B seismometers necessarily generate signals during the recording period in response to the seismic unrest of the ground on which they are planted and this, through coupling capacitor 21, imposes a noise signal on the input of transformer 25. It is this noise which my invention minimizes.

In FIGURE 1, a source of direct voltage 28 is preferably connected in series with an adjustable resistor 29. This D-C voltage is connected through the other poles of switches 23 and 24 so that when a seismometer group is not being recorded, the cable is connected across this source. In this case, by throwing switch 24 to the left, a suitable D-C voltage is applied across cable 20. As mentioned above, this serves as an electrical clamp for all the seismometers in group B, which minimizes the output of each individual seismometer. Care is taken that direct current never flows through the transformer primary coils, which would polarize the cores and lower transformer output.

Figure 2:
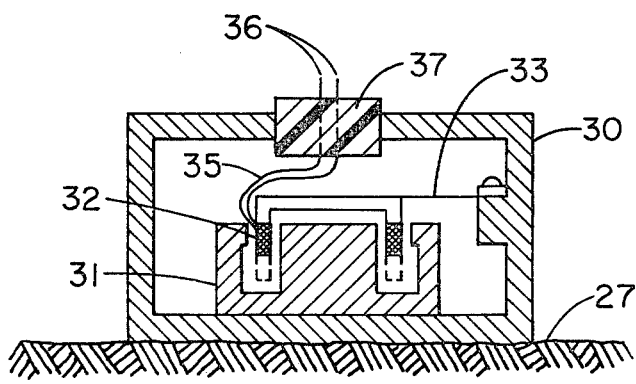
FIGURE 2 shows a diagrammatic cross section of a seismometer, illustrating the principle on which it operates.

The mechanical action resulting from the imposition of the electric current, due to the source 28 being applied across conductors 20, is illustrated diagrammatically in FIGURE 2. Here a typical seismometer is shown in cross section. The case 30 contains a magnetic structure 31 producing a radial magnetic field in the annular air gap. A coil 32 is elastically suspended from a flat spring 33 and centered in the air gap. Spring 33 in turn is clamped by a suitable clamping arrangement 34, of any of the well-known types, to case 30. Flexible leads 35 connect the coil to the seismometer output wires 36, let out through an insulating plug 37.

Application of the source 28 to the conductors to which the output wires 36 are attached produces a magnetic field in coil 32 which reacts with that from the magnetic structure 31. This mechanically drives the coil 32 either up or down. In FIGURE 2 this is illustrated by the magnetic coil moving to a position shown by the dotted lines. The coil is accordingly removed from the main part of the magnetic field and its output when shaken is correspondingly lowered compared to that found when the coil is in its normal position.

As an illustration, a typical field seismometer having a 72-ohm coil was connected through the cable conductors to a direct current source. A current of 5 milliamperes (0.5 amperes) through the seismometer moved the coil to such a position that the effective output of the seismometer was 32 db below its normal response to the same seismic wave. Since the amount of cross feed is directly proportional to the voltage generated in the seismometer group, the noise coupled to other conductors where the seismometers were being recorded was correspondingly reduced 32 db.

The amount of direct current required to do an effective clamping job can easily be determined by the field crew by simple testing. As a sort of rule of thumb, it can be said that if the direct voltage applied to the seismometer is approximately ten times (or more) that of the maximum generated voltage of the seismometer, under ordinary conditions of use, adequate clamping action is produced. Increasing the clamping voltage beyond that required under this rule ordinarily does not significantly improve the situation and, of course, is wasteful of electric energy, as well as offering the possibility of burning out the coil. With maximum length of field cables, I have found that typical clamping voltage will usually run from around 8.4 to 13 volts. There is no requirement as to polarity since it makes relatively little difference whether the clamped coil has been forced above or below its ordinary operating position.

Orinarily it is desirable to insert a milliameter to check that the right order of clamping current per seismometer group is being employed.

In the above discussion, only for simplicity, the effect of resistance between conductors has been ignored. However, simply for completeness it should be stated that whether the cross feed is capacitive or conductive (for example due to cables being wet), use of this electrical clamping system will minimize the cross feed.

Batteries are preferable to rotary D-C generators, or filtered rectifiers, because any of these latter types of sources contain alternating current components which will be coupled into the active seismometer channels to produce noise.

I claim:

1. In seismic prospecting equipment including at least two seismometers of the type in which output is generated by reactio between a magnetic field and a sprung, seismically responsive coil of wire, each connected to separate insulated conductors, there being coupling between said conductors, at least one of said conductors being connected to recording equipment and at least one of said conductors being unconnected to said recording equipment, the improvement comprising
    (a) a source of direct current, and
    (b) means for connecting said source to the unconnected conductors and for adjusting the resultant current to any seismometer connected thereto,
whereby motion between said field and said coil is reduced and cross feed due to voltage generated by any direct current-carrying seismometer is correspondingly reduced.

2. Apparatus in accordance with claim 1 in which said source is connected to all unconnected conductors in said equipment.

3. Apparatus in accordance with claim 1 in which the direct voltage applied across said coil of any seismometer attached to an unconnected set of conductors is at least about ten times the maximum generated voltage of any of said seismometers.

4. Apparatus in accordance with claim 1 in which the direct current applied through any of said seismometers is at least about five milliamperes.

References Cited

UNITED STATES PATENTS 2,408,478   10/1946   Petty _____ 340—17

SAMUEL FEINBERG, *Primary Examiner.*